(12) United States Patent
Harrod

(10) Patent No.: US 7,299,111 B2
(45) Date of Patent: Nov. 20, 2007

(54) METHOD OF CLEARING AN HVAC CONTROL FAULT CODE MEMORY

(75) Inventor: Gregory Ralph Harrod, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 492 days.

(21) Appl. No.: 11/051,651

(22) Filed: Feb. 4, 2005

(65) Prior Publication Data

US 2006/0179341 A1 Aug. 10, 2006

(51) Int. Cl.
*G01M 1/38* (2006.01)
(52) U.S. Cl. .................................... 700/276
(58) Field of Classification Search .......... 700/83, 700/110, 276, 278; 714/2
See application file for complete search history.

(56) References Cited

U.S. PATENT DOCUMENTS

| | | | |
|---|---|---|---|
| 4,211,089 A | | 7/1980 | Mueller et al. |
| 4,448,033 A | | 5/1984 | Briccetti |
| 4,573,326 A | | 3/1986 | Sulfstede et al. |
| 4,685,615 A | * | 8/1987 | Hart ............................ 236/94 |
| 5,042,265 A | | 8/1991 | Baldwin et al. |
| 5,113,665 A | | 5/1992 | Katsuki |
| 5,345,583 A | | 9/1994 | Davis |
| 5,729,990 A | * | 3/1998 | Basse et al. .................. 62/128 |
| 5,999,392 A | | 12/1999 | Sung et al. |
| 6,035,264 A | | 3/2000 | Donaldson et al. |
| 6,044,393 A | | 3/2000 | Donaldson et al. |
| 6,089,310 A | | 7/2000 | Toth et al. |
| 6,112,237 A | | 8/2000 | Donaldson et al. |
| 6,307,464 B1 | | 10/2001 | Miller et al. |
| 6,373,376 B1 | | 4/2002 | Adams et al. |
| 6,385,510 B1 | * | 5/2002 | Hoog et al. .................. 700/276 |
| 6,448,901 B1 | | 9/2002 | Adams et al. |
| 6,566,882 B2 | | 5/2003 | Baldwin et al. |
| 6,826,454 B2 | * | 11/2004 | Sulfstede ..................... 700/276 |
| 6,955,302 B2 | * | 10/2005 | Erdman, Jr. .................. 236/51 |
| 7,225,054 B2 | * | 5/2007 | Amundson et al. ......... 700/276 |
| 2003/0001577 A1 | | 1/2003 | Baldwin et al. |
| 2003/0061866 A1 | | 4/2003 | Kuzala et al. |
| 2004/0015570 A1 | | 1/2004 | Daum et al. |
| 2005/0125102 A1 | * | 6/2005 | Nichols et al. ............. 700/276 |
| 2005/0196285 A1 | * | 9/2005 | Jayanth ................... 417/44.11 |
| 2005/0228607 A1 | * | 10/2005 | Simons ...................... 702/122 |
| 2005/0240312 A1 | * | 10/2005 | Terry et al. ................. 700/276 |

* cited by examiner

*Primary Examiner*—Leo Picard
*Assistant Examiner*—Chad Rapp
(74) *Attorney, Agent, or Firm*—McNees Wallace & Nurick LLC

(57) ABSTRACT

A method of clearing an HVAC control fault code memory is disclosed. The method includes assigning a predetermined reset code to an HVAC control system, the predetermined reset code comprising a plurality of control signals receivable by the HVAC control system, detecting control signals at the HVAC control system, determining whether the detected HVAC control input signals match the predetermined reset code and clearing a fault code memory of the HVAC control system in response to control signals matching the predetermined reset code.

25 Claims, 5 Drawing Sheets

METHOD OF CLEARING AN HVAC CONTROL FAULT CODE MEMORY

FIELD OF THE INVENTION

The present invention is directed to a method of clearing an HVAC control fault code memory and more particularly to an automated method of clearing an HVAC control fault code memory using a predetermined set of control signals.

BACKGROUND OF THE INVENTION

Integrated or combined controls or control systems are common in the heating, ventilating and air conditioning (HVAC) industry. It is common for these types of controls to have some type of limited diagnostic capabilities, which typically result as an error code being translated as a blink code on an LED (light emitting diode), or as a display on a seven segment display. Until recently, most of these error codes were only shown while the actual error was happening, or while a lock-out condition persisted, while some controls might continue to display the fault code for a period of time after the fault condition abated. In any event, a loss of power to the control board resulted in a reset of the controls and the loss of any error information without the possibility of recall. So, when a repair technician went to evaluate a problem, because the home or business owner had usually already shut power down to the unit, the error code was no longer displayed. The service technician, upon arrival to the site, may also remove a metal panel which is often connected to a power disconnect switch. If this is done before looking through a site-glass for any applicable error codes (if a site-glass is even provided on the access door), again the potentially valuable information of the error code would be lost. Unless the error duplicates itself immediately upon test by the service technician, a lengthy trial and error period may be required to finally find and then fix the problem.

Over the last couple of years, an electrically erasable programmable read-only memory (EEPROM) and/or other non-volatile memory within a control panel has been used to store these error codes, such that they are displayable even after a power loss and control reset, or are otherwise recallable, such as through the use of an error recall mechanism. In some cases, even multiple errors are recorded in the EEPROM or other non-volatile memory, such that a history of faults can be saved and recalled. This type of error code information is extremely valuable to service technicians. Instead of an on-site service technician waiting for a problem to re-occur, or trouble shooting a broken furnace, for example, through a long process of trial and error techniques without any past history, the furnace control can direct the technician in the direction of the actual cause, and at least minimize the amount of trouble shooting required. The fault codes that are stored in memory can typically be cleared using a communications command or a switch such as a pushbutton on the control.

During production, HVAC units are typically tested after being assembled. During this process, commonly called "run testing," certain faults may occur or may be introduced into the unit to test various functions of the unit. These faults are stored in a fault code memory of the control. Prior to releasing the product for shipment to a customer, these faults must be cleared from the control memory so that the fault code history begins with installation of the unit.

Prior art controls typically have a switch, usually a button, on the control to clear the fault code memory, requiring that a factory worker interact with the control to clear the memory. The button is typically provided for a technician to recall errors stored in the fault code memory, but when held in a depressed fashion for a period of time, also acts to reset the fault code memory. Thus, a run test operator would typically have to depress the button for a certain period of time to clear the fault code memory after testing. This time is usually relatively long (several seconds) to make sure that the service technician doesn't inadvertently clear the memory while displaying active fault codes using the button. Pressing and releasing a control switch over and over may pose ergonomic problems for the worker and creates the possibility of damage to the control by mishandling. Furthermore, the human element creates the possibility of other errors, such as those that may arise from inconsistent manipulation of the control switch and the like.

Other types of prior art controls have a communications feature that clear the fault code memory when the HVAC control receives a certain command via a communications port. While this technique overcomes some deficiencies by eliminating the human element, the use of a communications port requires that the run test station have the ability to communicate with the communications control port. It also requires that a dedicated communications connection be made with the HVAC control in addition to the typical thermostat signal inputs used for run testing. This equipment is expensive and generally atypical in HVAC unit testing environments. Furthermore, making the communications connection to the control requires additional time, which slows production.

Accordingly, what is needed is a method for clearing an HVAC control fault code memory that overcomes these and other problems found in prior art systems.

SUMMARY OF THE INVENTION

A method for clearing an HVAC control fault code memory is disclosed that limits or avoids human intervention and makes use of connections and signals already used in the unit testing process.

According to an exemplary embodiment of the invention, a method for clearing an HVAC control fault code memory is disclosed. The method comprises assigning a predetermined reset code to an HVAC control system, the predetermined reset code comprising a plurality of control signals receivable by the HVAC control system, detecting control signals at the HVAC control system, determining whether the detected HVAC control signals match the predetermined reset code and clearing a fault code memory of the HVAC control system in response to the control signals matching the predetermined reset code.

According to another exemplary embodiment of the invention, a method for testing an HVAC unit is also disclosed. The method comprises electrically connecting a test station to a control system for an HVAC unit, receiving control signals from the test station at the HVAC control system, comparing the received control signals to a predetermined reset code, operating the HVAC unit using the control signals received from the test station in response to the received control signals being different from the predetermined reset code, detecting a fault condition during operation of the HVAC unit, storing a corresponding fault code in a fault code memory in response to detecting a fault condition; and clearing the fault code memory in response to control signals received from the test station matching the predetermined reset code.

According to yet another embodiment of the invention, a system for operating an HVAC unit is disclosed. The system comprises an HVAC unit having a control panel and a means for providing a plurality of control signals to the control panel. The control panel comprises a memory device to store a predetermined reset code, a fault code memory to store fault codes from faults occurring during operation of the HVAC unit, means for detecting the plurality of control signals received from the means for providing a plurality of control signals, means for comparing the detected plurality of control signals to the predetermined reset code, means for operating the HVAC unit in response to the detected plurality of control signals differing from the predetermined reset code, and means for clearing the fault code memory in response to the detected plurality of control signals matching the predetermined reset code.

An advantage of the present invention is that it avoids the use of a manual onboard switch to clear the fault code memory and decreases or eliminates human intervention in the fault code clearing process.

Another advantage of the present invention is that it may increase production process speed by incorporating logic into the HVAC control that reduces the time required to clear the fault code memory versus the time required if using the onboard switch.

Still another advantage of the present invention is that it allows the fault code memory to be cleared after unit testing without requiring additional communications equipment and it avoids the need to make an additional connection for each unit built and tested.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

HVAC units, like most products, are typically tested after manufacture and prior to installation. In most test situations, a control board or panel of a control system of the HVAC unit is typically connected to a test station. The test station typically includes a power source and a number of switches. The test station sends control signals that replicate the control signals that would be received by the HVAC control or control system when the HVAC unit is installed as part of an operating HVAC system. For example, a furnace has a control that, when installed, is connected to a thermostat. The thermostat sends control signals during operation to instruct the furnace, for example, to turn on or off or to operate a fan. Likewise, the test station is wired to the HVAC control board to provide the same control signals during testing operations. By "control signals" is meant any analog signal or combination of analog signals sent to the HVAC control system to provide instructions or other information for the operation of the HVAC unit.

During run testing, the HVAC unit may experience faults that are corrected prior to distribution or installation. Alternatively, if the HVAC unit experiences no faults during testing, faults may be intentionally introduced in the unit, for example, to determine that the unit is capable of properly detecting faults.

Faults may be recorded in a fault code memory of the HVAC control system. If a fault occurs after installation, a service technician can review the fault code memory to recall an error history that may be helpful in diagnosing a malfunctioning HVAC system or unit. However, fault codes recorded in the fault code memory during the testing procedure need to be cleared, reset or deleted following testing so that the fault history corresponds to actual installation of the HVAC unit. This may avoid, among other potential problems, an erroneous diagnosis during maintenance of the HVAC unit based on the fault code memory displaying a fault code for a fault that actually occurred prior to installation, i.e. during run testing at the factory.

Figure 1:
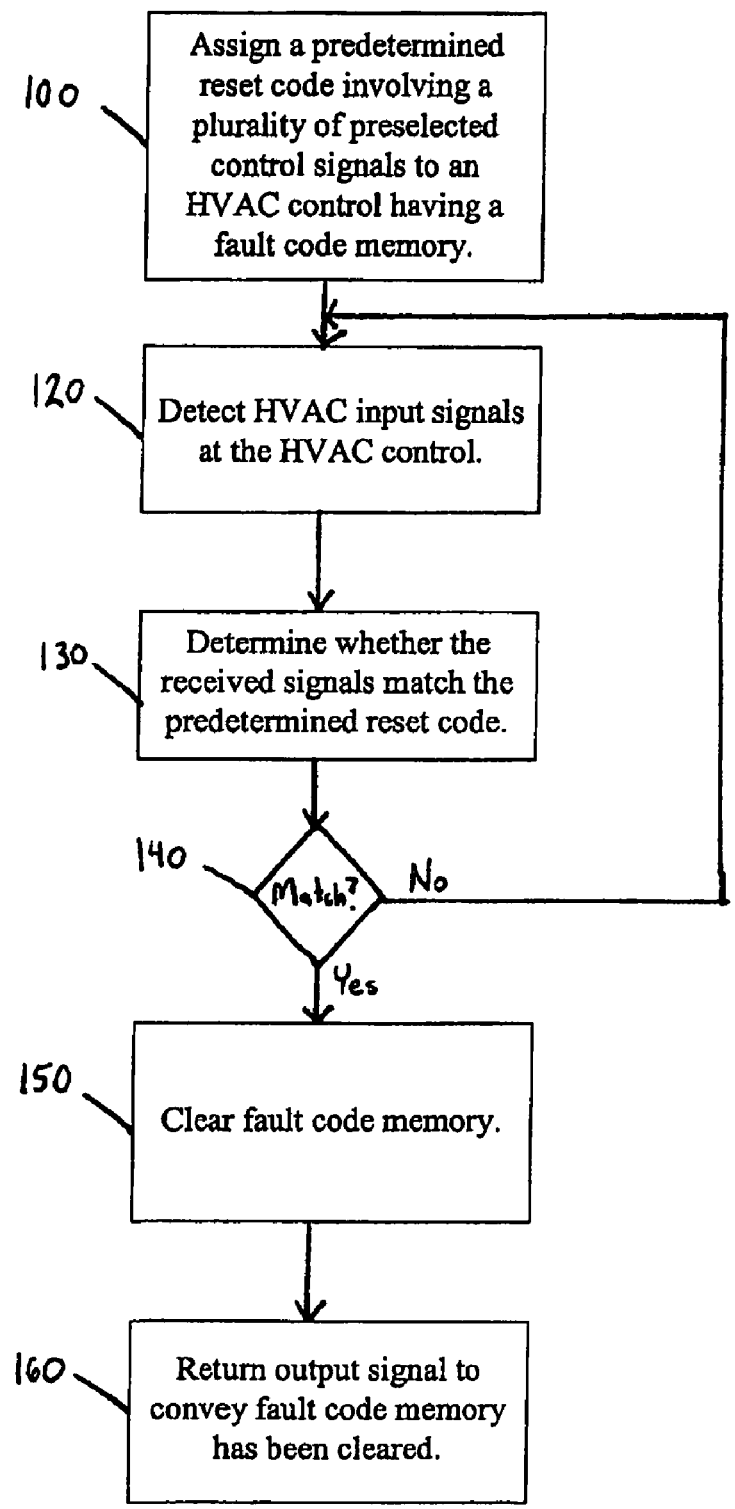
FIG. 1 is a flowchart depicting a method for clearing an HVAC control fault code memory according to an exemplary embodiment of the invention.

Referring to FIG. 1, a method for clearing the fault code memory is provided according to an exemplary embodiment of the invention. The method begins at step 100 in which a predetermined reset code involving a plurality of preselected control signals is assigned to an HVAC control system having a fault code memory. The HVAC control system can be a control device for any corresponding HVAC unit including, but not limited to, furnace controls for a furnace, heat pump controls for a heat pump, air handler controls for an air handler, and compressor controls for a compressor-bearing unit, such as an air conditioner or heat pump. The HVAC control's fault code memory can be any suitable electronic storage device as are known in the art and is typically an EEPROM or other non-volatile memory. Preferably, the fault code memory is capable of storing fault codes from multiple occurrences or types of faults in memory and more preferably is capable of storing at least five fault codes in memory at any one time.

The predetermined reset code used to clear the fault code memory is any desired combination or sequence or timed arrangement of HVAC control signals that, when received by the HVAC control system, clears the fault code memory. The control signals that comprise the reset code cause a certain logic sequence to occur in the control that clears the fault code memory. For example, the reset code may be a series of switches, signals or terminals that are energized or de-energized for a certain period of time. The reset code is preferably selected such that the particular sequence and/or combination of control signals would not be received by the HVAC control under ordinary conditions. In this way, the control signals during normal operation, or even upon the occurrence of a fault within the HVAC unit, would not inadvertently clear the fault code memory of the HVAC control. The reset code is programmed into the control when the control system is built, the reset code being programmed into a memory device of the control system.

At step 120, the HVAC control detects the presence of the control signals. During testing, the control signals ordinarily come as input signals from a test station wired to the HVAC control to cause the HVAC unit to behave in a desired fashion to test various aspects of the HVAC unit. The test station may be as simple as a power source, typically 24 VAC, and a series of switches connected via wires and/or relays to input terminals on the HVAC control. The switches or relays are typically activated by a computer programmed to test the HVAC unit. After installation of the HVAC unit, the HVAC control input signals would usually come from a thermostat or other device that provides control signals to an HVAC system.

Logic within the HVAC control then determines at step 130 whether the detected input control signals match the combination and/or sequence of control signals that comprise the predetermined reset code. A microprocessor or similar processing device within the control makes the logical comparison to make this determination. It will be appreciated that the type of control signals used to clear the fault code memory are the same control signals sent to the HVAC control to operate the HVAC unit. It is the combination and/or sequence and/or time arrangement of the control signals assigned in step 100 that determines whether a normal operating command is being given to the HVAC control or whether the input signals match the predetermined reset code corresponding to a command to clear the fault control memory.

If a match is not present at step 140, the HVAC control performs whatever function is associated with the control signals received and the method returns to step 120 to await receipt of additional control signals. If there is a match, the fault code memory is cleared or reset and any fault codes stored in the memory are deleted at step 150.

After the fault code memory is cleared, an output signal is returned that conveys the fault code memory has been cleared at step 160. The output signal may be any signal capable of being monitored to verify the fault code memory has been cleared. Typically, the HVAC control is equipped with an LED which can be directed to flash a certain number of times, such as three flashes in two seconds, for example, as a signal the memory has been cleared. The LED flash may be monitored by an actual individual or using a device such as an electronic eye capable of detecting the LED illumination. Alternatively, or in conjunction with a visible output signal, such as an LED, an electronic output signal can be returned to the test station via an output terminal on the HVAC control. Another way of communicating the fault code memory has been cleared may include activating a component of the HVAC unit, such as a blower or fan, for example.

Figure 2:
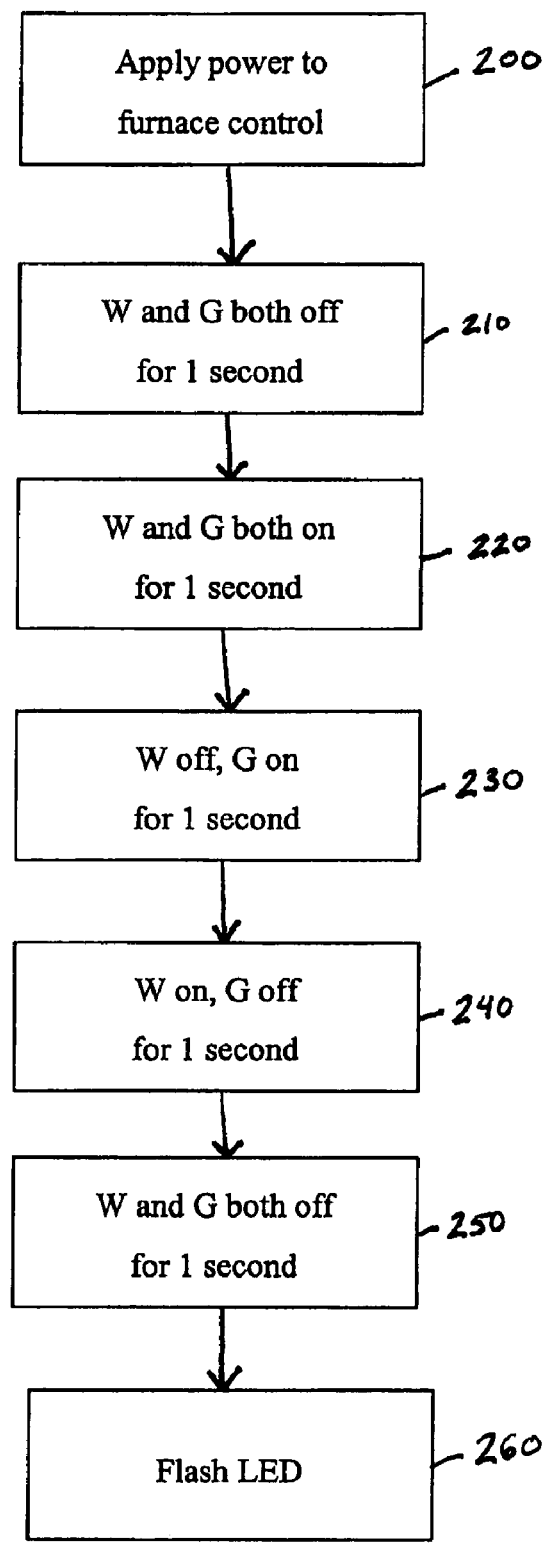
FIG. 2 is a flowchart depicting a method for clearing a furnace control fault code memory according to an exemplary embodiment of the invention.
Figure 3:
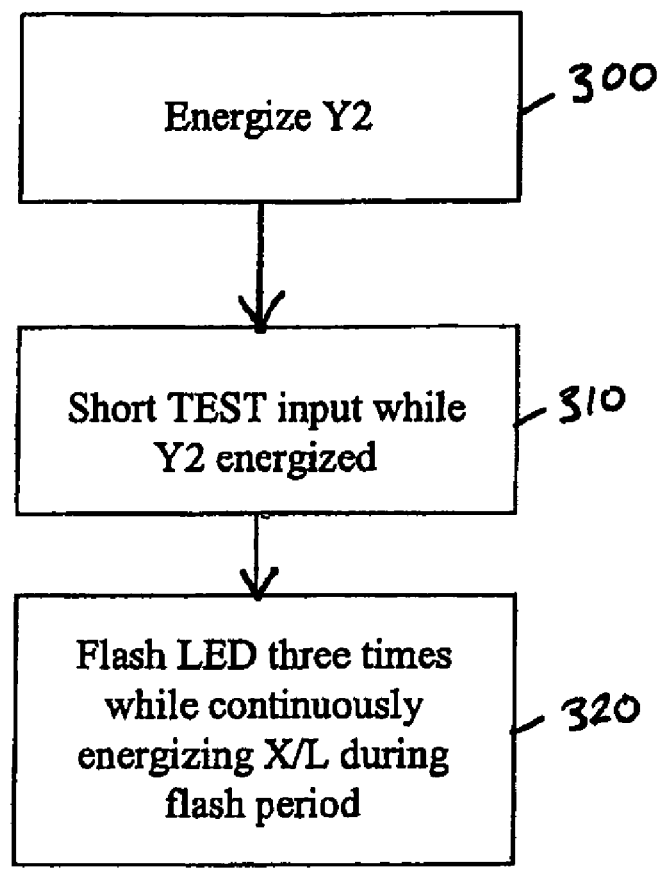
FIG. 3 is a flowchart depicting a method for clearing a heat pump control fault code memory according to an exemplary embodiment of the invention.

FIGS. 2 and 3 demonstrate specific examples of control signal combination sequences that can be used as a reset code to reset the HVAC control fault code memory.

FIG. 2 demonstrates an exemplary reset sequence for a furnace control fault code memory, the furnace having at least two input terminals, including a heat terminal designated "W" and a fan terminal designated "G." The terminals are turned on or off in order to transmit the control signals needed to reset the fault code memory. At step 200, power is applied to the furnace control. W and G are both off for one second, then both on for one second at steps 210 and 220 respectively. Next, at step 230, W is off for one second while G is on for that same second. Then, W is on for one second and G is off that second at step 240. Finally, W and G are both off for 1 second at step 250. With respect to this example, this series of HVAC control signals matches the reset code and when received, the fault control memory is cleared and an LED on the HVAC control flashes at step 260, indicating the fault control memory has been cleared.

It will be appreciated that this exemplary sequence could be modified using different terminals or different combinations and that similar sequences could be implemented in HVAC units other than a furnace. As previously discussed, combinations and sequences used as the predetermined reset code are preferred that would rarely, if ever, be received by an HVAC control during normal operation of an HVAC unit. This is exemplified by the sequence of FIG. 2 that involves the succession of switching the fan and heat terminals on or off relative to one another for discrete periods of time.

It will be further be appreciated that additional logic could be incorporated into the HVAC control system that requires the input signal combination and/or sequence to occur within a particular period of time, i.e., a timed arrangement. For example, again with respect to FIG. 2, the five combinations of W and G switching could be required to occur within a certain period of time after power-up. By way of further example, the five one-second furnace control input signals of FIG. 2 could be required to be completed within seven seconds of powering the furnace. The furnace could be powered down after testing, the furnace having a number of faults stored in the control's fault code memory. The test station then powers up the furnace and sends the requisite control input signals to the HVAC control. If the sequence is completed within seven seconds, the logic of the HVAC control would determine that the sequence was a command to reset the fault code memory and clear it accordingly.

The HVAC control system may have a "test" input terminal that can be activated to provide a test mode for an HVAC unit, such as a heat pump or air conditioner, for example. The test mode may allow unit testing to proceed more quickly by shortening or bypassing certain timings or delays of the HVAC control that would be executed prior to other operations of the unit during normal operation. A typical example of test input terminal usage is to bypass an anti-short cycle delay timer. Such timers are often used on HVAC controls for compressor-bearing units. The timer prevents the compressor from being energized within a certain period of time of being de-energized, typically several minutes. The test input provides a way to bypass the period of delay during testing.

FIG. 3 illustrates a sequence of control signals used to reset the control fault code memory of an HVAC unit with a heat pump control having a cooling input terminal designated "Y2" and a "test" input terminal. The test input terminal is connected to the test station to provide a test mode for truncated testing operations of the HVAC unit. After testing is complete, but prior to disconnecting the test input terminal, the Y2 input is energized at step 300. While the Y2 input is being energized, the test input signal is shorted at step 310. According to this example, this series of heat pump control signals matches the predetermined reset code and thus clears the control's fault code memory of any faults that occurred during the testing. At step 320, an LED on the HVAC control is flashed three times to provide a visual confirmation that the fault code memory has been cleared. Additionally, while the LED flashes, an output terminal designated X/L is continuously energized by the control, returning an electronic confirmation to the test station.

Figure 4:
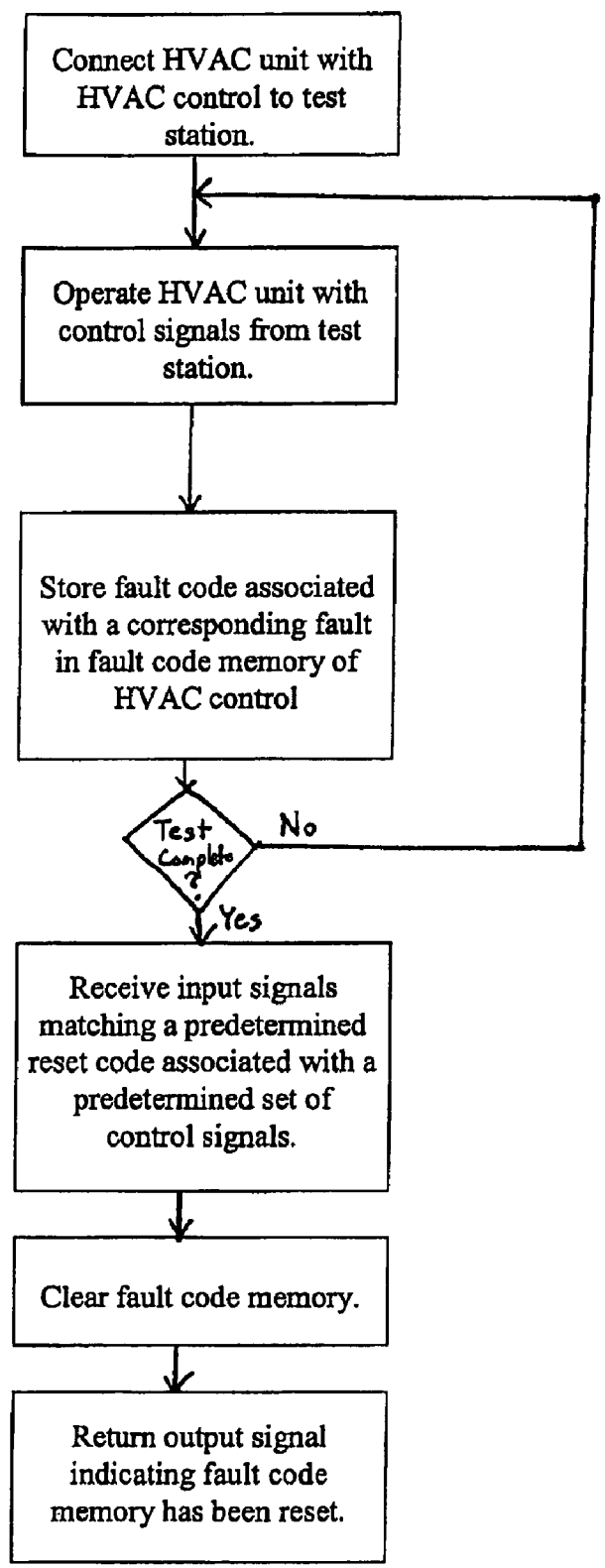
FIG. 4 is a flowchart depicting a method for testing an HVAC unit having an HVAC control with a fault code memory according to an exemplary embodiment of the invention.

Methods used to clear the HVAC control fault code memory can be implemented in a method of testing HVAC units as shown with reference to FIG. 4. At step 400, an HVAC unit having an HVAC control is electrically connected to a test station. As discussed, the test station may be as simple as a power source and a series of wires and switches that can be energized or de-energized to send a signal to a particular HVAC control terminal.

At step 410, the HVAC unit is operated via control signals applied to HVAC control terminals by the test station in performing a test sequence to evaluate various aspects of the HVAC unit, such as verifying gas valve or blower operation of a furnace or a defrost operation of a heat pump, for example. As the test proceeds, faults are stored in the fault code memory at step 420. Different fault types can correspond to particular fault codes to assist in the diagnosis of an HVAC unit malfunction. The faults may occur as a result of a malfunction in the HVAC unit during testing or the faults may be induced to verify the fault code memory properly stores fault codes and that the stored fault codes are associated with the correct type of faults.

As long as the test sequence continues, the HVAC control continues to receive control signals from the test station to simulate the operation of the HVAC unit. Once the test is completed at step 430, the HVAC control receives from the test station a set of signals that matches the predetermined reset code stored in the HVAC control at step 440. The receipt of the predetermined reset code indicates that the test is complete and that a command is being given to clear the fault code memory, which occurs at step 450. The HVAC control generates an output signal that indicates that the fault code memory has been cleared at step 460.

Figure 5:
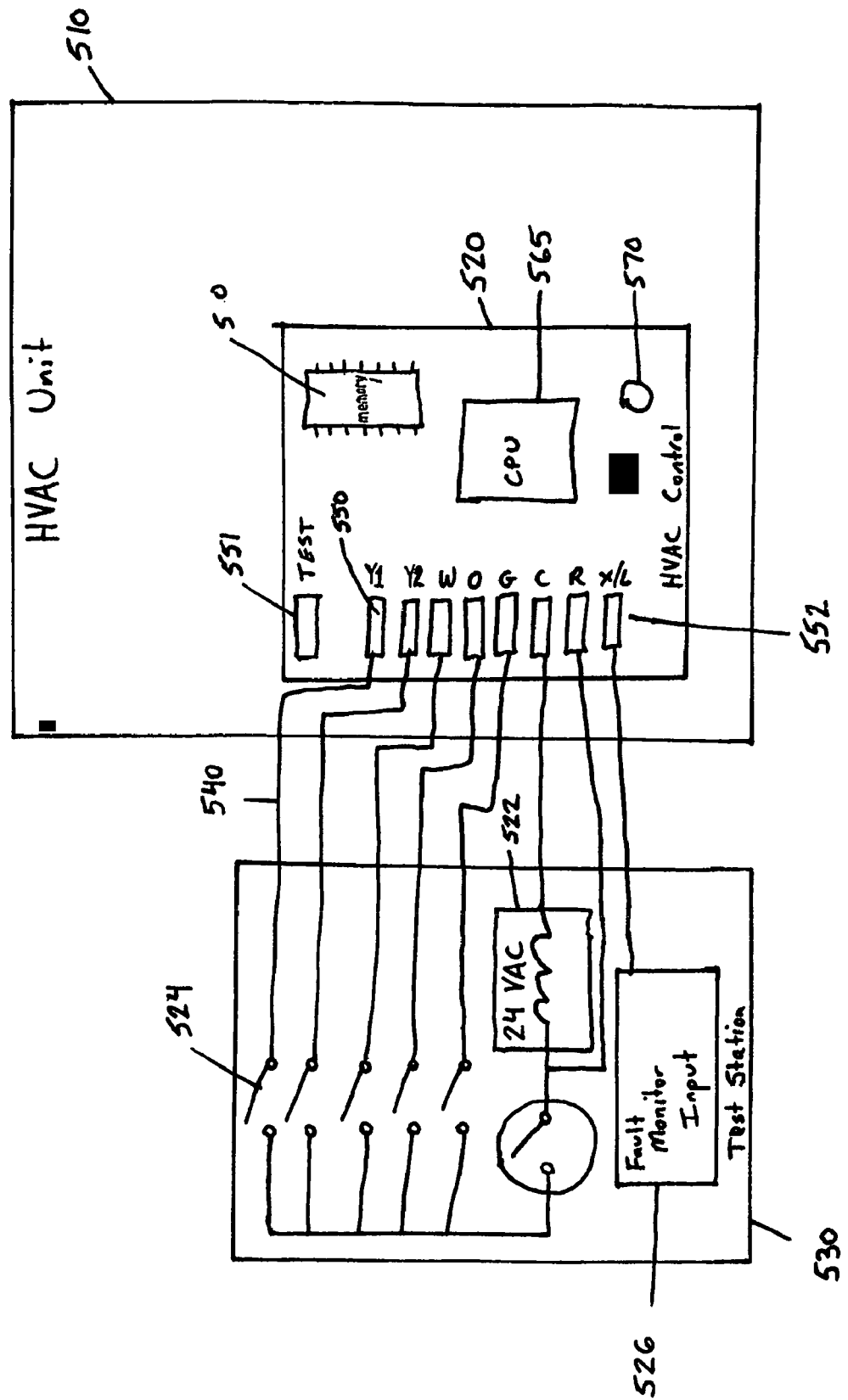
FIG. 5 is a schematic of a system for operating an HVAC unit according to an exemplary embodiment of the invention.

FIG. 5 shows an exemplary testing arrangement 500. An HVAC unit 510 having an HVAC control 520 is connected to a test station 530 via wires 540. At least some of the wires 540 from the test station 530 are connected to one or more terminals 550 on the HVAC control 520. It will be appreciated that not all of the terminals 550 need be connected to all of the wires 540 of the test station 530 or vice versa depending on the particular functions being tested on the HVAC unit 510. It will further be appreciated that a test input 551 need not necessarily be connected when the HVAC unit 510 is being tested, depending on the desired type of testing.

The HVAC control 520 also includes a fault code memory 560. The fault code memory 560 can be any kind of memory device for storing fault codes during operation of the HVAC unit 510 but is preferably an EEPROM memory. The HVAC control 520 further includes an output device, which may include an LED 570, that can be used to flash stored error codes to a technician for diagnosis of a malfunction in addition to flashing a pattern to confirm the fault code memory has been cleared after testing. Alternatively, or in combination with the LED 570, the output may include sending a signal to a fault monitor input 526 of the test station 530 from an output terminal 552, here designated as the X/L terminal, of the HVAC control 520.

The test station 530 includes wires 540 that connect to the HVAC control 520 to create a circuit and a power source 522, typically 24 VAC, to deliver the control signals to the HVAC control terminals 550 to test the HVAC unit 510 and later to clear the fault code memory 560 after testing. The control signals are typically sent by opening or closing one or more switches 524 within the test station 530 to complete a circuit. Based on the pre-programmed logic executed by a microprocessor 565 of the HVAC control 520, the HVAC control 520 directs the HVAC unit 510 to perform certain operations depending on the control input signals received. When the HVAC control input signals received by the HVAC control 520 match the predetermined reset code, the control fault code memory 560 is cleared and a confirmation is returned, which may be either or both of an electronic output monitored by the test station 530 via the fault monitor input 526 or a visible or other type of signal that can be monitored by a person, such as, by way of example only, flashing the LED 570 or activating a component of the HVAC unit 510 such as activating a fan or blower (not shown) of the HVAC unit 510 for a short period of time.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for clearing a fault code memory of an HVAC control system, the method comprising the steps of:
    assigning a predetermined reset code to an HVAC control system associated with an HVAC unit, the predetermined reset code comprising a plurality of control signals receivable by the HVAC control system;
    detecting control signals at the HVAC control system;
    determining whether the detected HVAC control signals match the predetermined reset code; and
    clearing a fault code memory of the HVAC control system in response to control signals matching the predetermined reset code.

2. The method of claim 1, wherein the predetermined reset code comprises a predetermined sequence of the plurality of control signals.

3. The method of claim 1, wherein the predetermined reset code comprises a predetermined combination of the plurality of control signals.

4. The method of claim 1, wherein the predetermined reset code comprises a timed arrangement of the plurality of control signals.

5. The method of claim 1, wherein the step of clearing a fault code memory includes clearing an electrically erasable programmable read-only memory.

6. The method of claim 1 further comprising the step of sending control signals from a test station to the HVAC control system.

7. The method of claim 1 further comprising the step of returning an output signal to communicate that the fault code memory has been cleared.

8. The method of claim 7, wherein the step of returning an output signal comprises illuminating an LED a predetermined number of times.

9. The method of claim 7, wherein the step of returning an output signal comprises activating a component of the HVAC unit.

10. The method of claim 1, wherein the plurality of control signals includes heating control signals, cooling control signals, ventilation control signals, or combinations thereof.

11. The method of claim 1, wherein the plurality of control signals correspond to control signals from a thermostat.

12. A method for testing an HVAC unit comprising:
    electrically connecting a test station to a control system for an HVAC unit;
    receiving, by the control system, control signals from the test station at the HVAC control system;

comparing the received control signals to a predetermined reset code;

operating the HVAC unit using the control signals received from the test station in response to the received control signals being different from the predetermined reset code;

detecting a fault condition during operation of the HVAC unit;

storing a corresponding fault code in a fault code memory in response to detecting a fault condition; and clearing the fault code memory in response to control signals received from the test station matching the predetermined reset code.

13. The method of claim 12, further comprising the step of returning an output signal to communicate that the fault code memory has been cleared.

14. The method of claim 13, wherein the step of returning an output signal comprises illuminating an LED a predetermined number of times.

15. The method of a claim 13, wherein the step of returning an output signal comprises sending an electronic signal from an output terminal of the HVAC control signal to the test station.

16. The method of claim 12, wherein the predetermined reset code is a sequence of control signals, a combination of control signals, a timed arrangement of control signals, or combinations thereof.

17. The method of claim 12, wherein the control signals of the predetermined reset code are sent from terminals on the test station to corresponding terminals on HVAC control system.

18. A system for operating an HVAC unit comprising:
an HVAC unit having a control panel; and
means for providing a plurality of control signals to the control panel; the control panel comprising
a memory device to store a predetermined reset code;
a fault code memory to store fault codes from faults occurring during operation of the HVAC unit;
means for detecting the plurality of control signals received from the means for providing a plurality of control signals;
means for comparing the detected plurality of control signals to the predetermined reset code;
means for operating the HVAC unit in response to the detected plurality of control signals differing from the predetermined reset code; and
means for clearing the fault code memory in response to the detected plurality of control signals matching the predetermined reset code.

19. The system of claim 18 wherein the predetermined reset code is a sequence of control signals, a combination of control signals, a timed arrangement of control signals, or combinations thereof.

20. The system of claim 18 wherein the fault code memory is an electrically erasable programmable read-only memory.

21. The system of claim 18 further comprising means for communicating the fault code memory has been cleared.

22. The system of claim 18 wherein the means for providing a plurality of control signals is a test station.

23. The system of claim 18 wherein the means for providing a plurality of control signals is a thermostat.

24. The system of claim 18, wherein the plurality of control signals includes heating control signals, cooling control signals, ventilation control signals, or combinations thereof.

25. The system of claim 18, wherein the plurality of control signals correspond to control signals from a thermostat.

* * * * *